Dec. 18, 1951     A. BEAUPRE     2,578,663
FISHING ROD
Filed June 23, 1945     2 SHEETS—SHEET 1
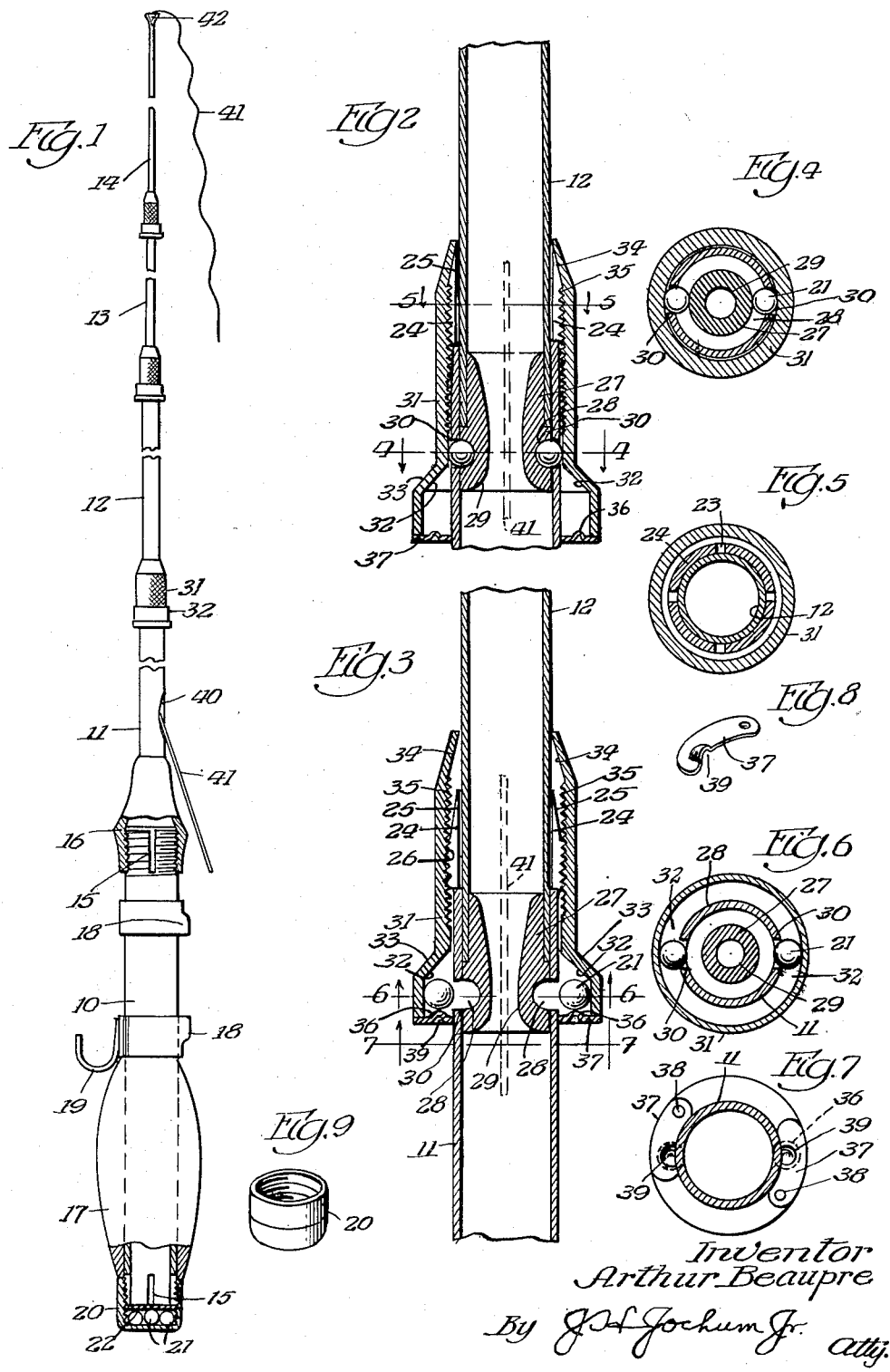
Inventor
Arthur Beaupre
By J. H. Jochum Jr.
atty.

Dec. 18, 1951  A. BEAUPRE  2,578,663
FISHING ROD
Filed June 23, 1945  2 SHEETS—SHEET 2
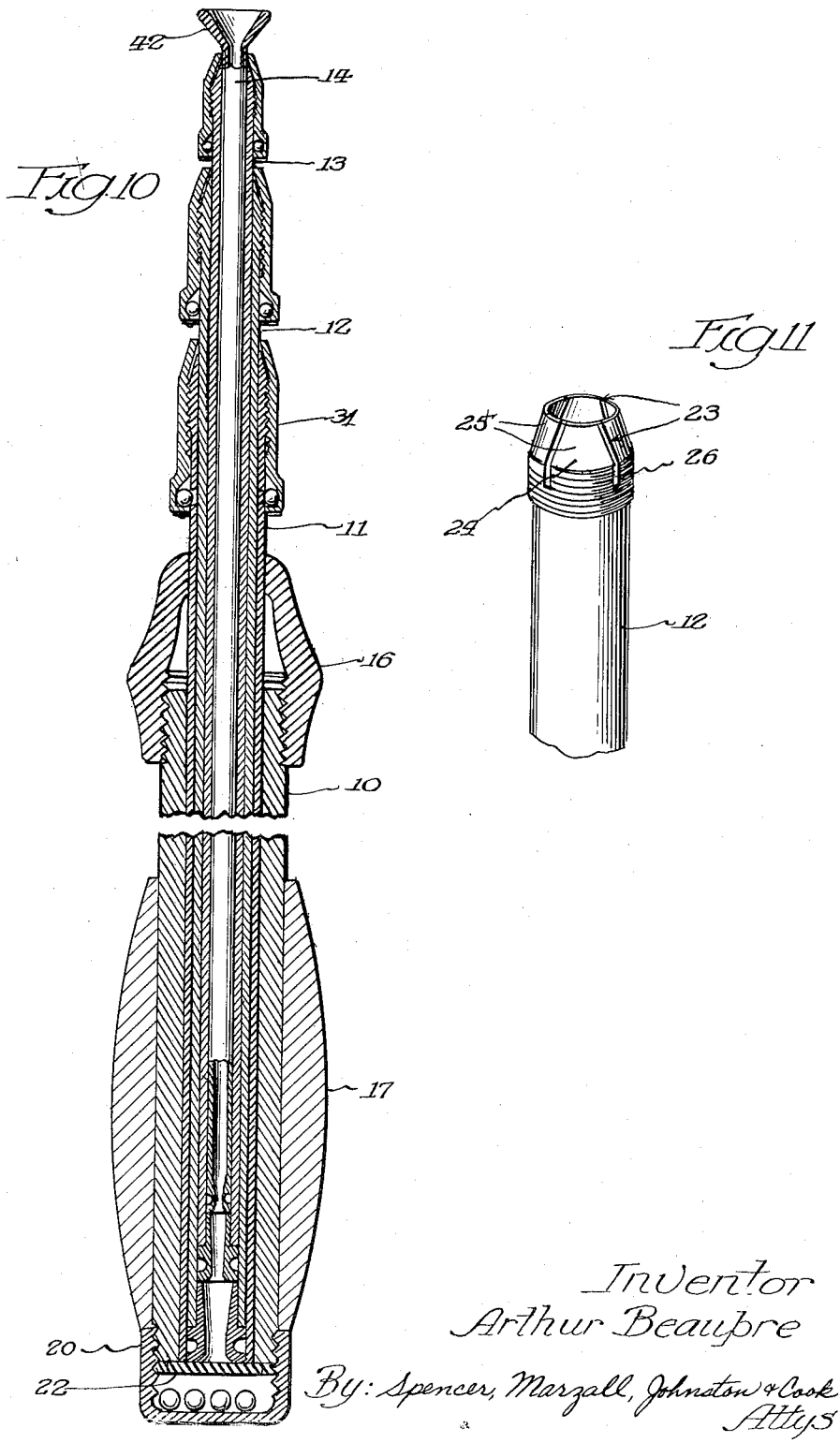
Inventor
Arthur Beaupre
By: Spencer, Marzall, Johnston & Cook
Attys Patented Dec. 18, 1951

2,578,663

UNITED STATES PATENT OFFICE 2,578,663

FISHING ROD

Arthur Beaupre, Franklin Park, Ill.

Application June 23, 1945, Serial No. 601,266

1 Claim. (Cl. 43—18)

This invention relates to improvements in collapsible rods, particularly adapted, though not necessarily limited in use, for fishing rods.

One of the principal objects of the invention is to provide a rod of this character, constructed of a plurality of telescoping sections whereby the rod may be readily collapsed, when desired, and as readily extended for use.

A further object of the invention is to provide an improved rod having means whereby the sections may be locked or secured in position with respect to each other, thereby rendering it possible to vary the length of the rod at will.

A further object of the invention is to provide an improved collapsible rod having means for reversing the handle for different types of use, without interfering with the collapsible nature of the rod.

A still further object of the invention is to provide improved means for removing and replacing the locking elements used in reducing or extending the rod.

Still another object of the invention is to provide an improved rod of this character, which will be of a simple, durable, strong and light construction, effective and efficient in operation, and one which may be collapsed into a comparatively small space when not in use.

To the attainment of these ends, and the accomplishment of other new and useful objects as will appear, the invention consists in the features of novelty in substantially the construction, combination and arrangement of the several parts, hereinafter more fully described and claimed, and shown in the accompanying drawing illustrating the invention, in which Fig. 1 is a side elevation, with parts broken away, of a collapsible fishing rod, constructed in accordance with the principles of this invention;

Fig. 2 is a sectional view of one of the section locking means in locking position;

Fig. 3 is a sectional view of one of the locking sections in released position, so that the sections are free for relative adjusting movement;

Fig. 4 is a transverse sectional view taken on line 4—4, Fig. 2;

Fig. 5 is a transverse sectional view taken on line 5—5, Fig. 2;

Fig. 6 is a transverse sectional view taken on line 6—6, Fig. 3;

Fig. 7 is a transverse sectional view taken on line 7—7, Fig. 3;

Fig. 8 is a perspective view of one of the locking ball retainers; and

Fig. 9 is a sectional view of the locking ball cap removed from the end of the handle section, Fig. 10 is a longitudinal sectional view of the fishing rod in collapsed condition, with parts broken away; and Fig. 11 is a perspective view of the outer end of one of the rod sections, and showing the tong and slit construction.

Referring now more particularly to the drawings, a collapsible fishing rod in accordance with this invention, comprises a tubular handle section 10 and a plurality of graduated tubular sections 11, 12, 13 and 14 which telescope one within the other, and within the handle section 10. The ends of the handle portion 10 are externally threaded, and provided with slits 15 extending inwardly from the ends for receiving an internally threaded clamping device 16. The clamping device 16 may be attached to either end of the handle 10. The clamping device 16 is adapted to compress the split ends of the handle for clamping the largest telescoping section 11 tightly therein.

At one end of the handle section is a grip 17, and intermediate the ends is a suitable reel attaching means comprising collars 18, one with a hook 19 projecting therefrom. This handle portion may be reversed end for end, and the fishing rod is adapted to be used, in one position, as a bait casting rod, and, in the other or reversed position, as a fly fishing rod.

To close the outer extremity of the handle 10, a threaded cap 20 is applied to it, which has a space for receiving clamping balls 21 by loosely inserting a partition 22 between the balls and the end of the handle section 10, as shown more clearly in Fig. 1.

For locking the telescoping sections together, the outer end of each section has inwardly extending splits 23 forming yielding tongues 24 that are integral therewith, the portions 25 near the ends being beveled or inclined, and having threads 26 at a distance from the ends. At the rear end of each section, and attached thereto and forming a part thereof is an end member 27 preferably projecting beyond the end of the section and having a recess 28 extending entirely around the member, with a central inner bore 29 communicating with the interior of the rod section to which it is attached.

Near the outer end of each telescoping member are apertures 30 through the wall of the section, preferably in opposite relation to each other, and of a size to permit a locking element in the form of a ball 21 to pass therethrough and into the recess 28.

In order to effect a locking relation between the respective telescoping sections, a collar member 31 is movable on the outer end of each section, and has an annular recess 32 at its inner end for seating a locking ball 21 therein, said recess being provided with an inclined wall portion 33 at a distance from the end for engaging the ball locking elements when the collar is moved endwise, to press the locking elements inwardly through the apertures 30 and into the recess 28 of the inner telescoping section, thus locking the members tightly together. To effect this movement, and also to grip the sections together, the outer end of the collar 31 has an inner inclined surface 34 adapted to engage the beveled surface 25 at the end of the section, with threads 35 at the inner end of the inclined surface 34 adapted to engage with the threaded portion 26 and to move the collar lengthwise when it is turned, so that the split tongues 24 are pressed inwardly by the engagement of the correspondingly inclined surfaces 25 and 34, as shown in the locking position in Fig. 2.

When the collar is moved relatively outward from the end of its rod section, the split tongues 24 are relieved, the recesses 32 are moved opposite the apertures 30, and the locking balls 21 may be moved outwardly therein, thus allowing the inner rod section to be moved relatively to the outer one, either for telescoping it within the outer section or for removing it entirely therefrom.

If one section is to be removed from the other, the locking elements would tend to be displaced through the wall apertures 30 inside of the tube, and means is therefore provided for discharging and applying the locking balls outside of the tube, when desired. This means comprises an opening 36 for each ball at the end of the collar 31, and through a wall of the recess 32, which openings are each normally closed by a holding clip 37 mounted on a pivot 38 at the end of the collar, and having an upstruck portion 39 which tends normally to remain seated in the opening 36.

To remove the balls, the collar is moved outwardly away from the end of its tubular section, the holding clips 37 are moved outwardly to uncover the openings 36, and the continued longitudinal movement of the collar, with the balls seated in the apertures 30, will permit the removal of the collar, the balls passing outwardly from the recess 32 and through the openings 36, as the collar passes the apertures 30 in the walls of the tubular member.

To replace the balls, the holding clips 37 are moved outwardly, uncovering the end openings 36, and the above operation is reversed.

In the tubular rod section nearest the handle, is an opening 40 through which a fishing line 41 may be inserted to the interior of the rod sections, and extending therethrough to the outermost tip, where an open extremity 42 is provided, slightly flaring and rounded so that the line may extend in any direction therefrom without the wear which is caused by passing through an eye or hook, thus making unnecessary any eyes or ferrules at the outside of the rod sections, so that the line is free to flex in all directions.

With this locking means, the rod sections are locked tightly together, and may be quickly and easily released for collapsing and telescoping them. When the sections are all telescoped, they extend together into the handle section, with the locking means projecting at the end thereof. To reverse the handle, it is simply threaded out of the clamping device 16 and placed end for end as desired. The cap 20 is easily removable, and may be used to contain additional locking ball elements when threaded on the end of the handle 10.

While the preferred form of the invention has been herein shown and described, it is to be understood that various changes may be made in the details of construction and in the combination and arrangement of the several parts, within the scope of the claim, without departing from the spirit of this invention.

What is claimed as new is:

A fishing rod comprising a tubular handle section, a plurality of tubes of progressively decreasing external diameter, telescopically related to each other and to the handle section, a circular clamp for securing the handle section to the tube of largest diameter, and circular clamps for securing each tube except the smallest diameter tube to the nearest smaller diameter tube, said handle section being threaded at the ends thereof, said threaded ends having corresponding external diameters and being slitted, and the first clamp having an internal diameter corresponding to the external diameter of the ends of the handle section, whereby said handle section may be reversed in position.

ARTHUR BEAUPRE.

REFERENCES CITED

The following references are of record in the file of this patent:

UNITED STATES PATENTS

| Number | Name | Date |
| --- | --- | --- |
| 108,679 | Boyden | Oct. 25, 1870 |
| 618,639 | Bullard | Jan. 31, 1899 |
| 814,321 | Pepper | Mar. 6, 1906 |
| 1,031,637 | Fischer | July 2, 1912 |
| 1,168,540 | Musselman | Jan. 18, 1916 |
| 1,359,668 | Buchenau | Nov. 23, 1920 |
| 1,587,446 | Viers | June 1, 1926 |
| 1,595,275 | White | Aug. 10, 1926 |
| 1,661,868 | Armstrong et al. | Mar. 6, 1928 |
| 1,761,943 | Summers et al. | June 3, 1930 |
| 1,858,595 | Parker et al. | May 17, 1932 |
| 1,898,945 | Fitzgerald | Feb. 21, 1933 |
| 2,255,695 | Bull | Sept. 9, 1941 |
| 2,279,324 | Pallen | Apr. 14, 1942 |
| 2,388,056 | Hendricks | Oct. 30, 1945 |